United States Patent [19]

Gerety et al.

[11] Patent Number: 4,800,523

[45] Date of Patent: Jan. 24, 1989

[54] DEVICE INTERFACE CONTROLLER HAVING DEVICE SPECIFIC AND DEVICE COMMON INSTRUCTIONS SEPARATELY STORED

[75] Inventors: Eugene P. Gerety, Wolcott; Jitender K. Vij, Trumbull, both of Conn.

[73] Assignee: ITT Corporation, New York, N.Y.

[21] Appl. No.: 158,136

[22] Filed: Feb. 16, 1988

Related U.S. Application Data

[63] Continuation of Ser. No. 705,458, Feb. 25, 1985, abandoned.

[51] Int. Cl.[4] .............................................. G06F 13/00
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 4,115,852 | 9/1978 | Rozell | 364/200 |
| 4,156,932 | 5/1979 | Robinson et al. | 364/200 |
| 4,321,665 | 3/1982 | Shen et al. | 364/200 |
| 4,371,932 | 2/1983 | Dinwiddie, Jr. et al. | 364/200 |
| 4,452,136 | 6/1984 | Boynton et al. | 101/93.05 |
| 4,485,439 | 11/1984 | Rothstein | 364/200 |

*Primary Examiner*—Gary V. Harkcom
*Assistant Examiner*—Randy W. Lacasse
*Attorney, Agent, or Firm*—Peter A. Abruzzese; Walter J. Baum

[57] ABSTRACT

An apparatus for controlling a plurality of peripherals attached to a common high speed parallel bus, includes a first program therein, which program includes a fixed set of generalized command and control instructions and a device specific program therein, which device specific program includes command and control instructions for a plurality of different devices.

13 Claims, 7 Drawing Sheets

| FIG. 3A | FIG. 3B |

DEVICE INTERFACE CONTROLLER HAVING DEVICE SPECIFIC AND DEVICE COMMON INSTRUCTIONS SEPARATELY STORED

This is a continuation, of application Ser. No. 705,458, filed Feb. 25, 1985, now abandoned.

CROSS-REFERENCE TO RELATED APPLICATIONS

This application is related to one, or more, of the following U.S. patent applications: Ser. No. 670,682, now Pat. No. 4,644,348;Ser. No. 670,701, now Pat. No. 4,638,311 both filed on Nov. 13, 1984. Ser. No. 705,456, now abandoned; Ser. No. 705,457, now Pat. No. 4,780,813; Ser. No. 705,459 now abandoned; Ser. No. 705,460 now Pat. No. 4,719,617; Ser. No. 705,461, now Pat. No. 4,677,611; Ser. No. 705,462 now abandoned; Ser. No. 705,463, now abandoned; Ser. No. 705,465 now Pat. No. 4,653,047; Ser. No. 705,464 all filed on even date herewith. All of the above applications are assigned to the assignee hereof.

BACKGROUND OF THE INVENTION

The present invention generally relates to a device interface controller and, in particular, relates to one such device interface controller that provides communication and control information for a plurality of peripherals.

Since the advent of data communications, a major task has been the efficient control of peripherals. Historically, this task has been, and remains, difficult, not only because of the variety of peripherals available, e.g., workstations, printers, or the like, but also because of the variety of operating data rates and different manufacturer specifications thereof. The task is further complicated by the variety of microprocessing devices available, most of which are unable to directly exchange information with a peripheral and therefore require some form of a device interface controller to allow communications between a peripheral and a microprocessor controlling the flow of data.

One conventional resolution of these difficulties has been to include a device interface controller that contained a set of instructions, i.e. a dedicated program, designed to control a specific peripheral. In addition, a data storage medium, such as a random access memory (RAM), was introduced between the microprocessor device and the device interface controller. In operation, the microprocessor device would transfer a bit of information into the storage medium via the local bus thereof. The microprocessor would then transfer this single piece of information to the device interface controller. The peripheral would then be controlled, in accordance with the stored program, to accept the information. The device interface controller, upon completing the bit transfer, would interrogate the storage medium, or simply become idle, to obtain the next information to be transferred. The storage medium would contain instructions that would cause, once the information had been transferred to the device interface controller, the microprocessor device to be interrupted, frequently regardless of the task being performed thereby, to request the next information.

This transfer process is clearly extremely slow and inefficient. Thus, present systems generally include expanded registers into which the microprocessor device provides larger amounts of information, which information is then relayed to the peripheral via the device interface controller. The advantage gained by this technique is an increase in the time interval between interrupts from the storage medium to the microprocessor device.

Nevertheless, most conventional systems frequently require information to be transferred between the microprocessor device and the storage medium along the local bus of the microprocessor. This same local microprocessor bus is also utilized to transfer information between the storage medium and the device interface controller. Consequently, in addition to interrupting the microprocessor for further instructions, the microprocessor is interrupted, i.e., removed from access to the local bus thereof, during the actual transfer of data between the storage medium and the device interface controller. Consequently, the microprocessor frequently has insufficient access to the local bus thereof to enable it to control more than a single peripheral at any given time.

One conventional solution to this inefficient arrangement is to provide an additional set of instructions, separate from the microprocessor, for the device interface controller. This approach thus unloads some of the functions ordinarily performed by the microprocessor and hence, improves the overall operating speed of the microprocessor. To date, however, the program of fixed instructions has been stored within the storage medium thereby reducing the memory capacity available to the entire system and increasing traffic therethrough thus limiting access to the bus of the microprocessor. The inherent trade-off of this technique is an increase time between microprocessor interrupts from the storage medium against the reduction of available memory. However, without such a program, the device interface controller is most commonly limited to accessing blocks of continuous data within the storage medium, beginning at an address provided thereto by the microprocessor. Consequently, once that block of data is transferred, the microprocessor device must refill the block and indicate to the device interface controller what and where the address is for that information.

Another major aspect of conventional device interface controllers is that specific control instructions are required for each particular peripheral that it is handling. Hence, by providing such a program within the storage medium, the specific control instructions for the controlled peripheral can be stored therein and, thus, remove further work from the microprocessor. Unfortunately, the inclusion of such specific control instructions requires additional portions of the storage medium, which would ordinarily be used for storing information to be transferred between the microprocessor and the periperal. Thus, present device interface controllers and the microprocessors interfacing therewith are quite limited in the number of peripherals that can be handled thereby by any one, or more, of four basic detrimental conditions. These detrimental conditions are generally referred to as bus latency, bus occupancy, interrupt latency, and interrupt service time.

The condition of bus latency arises because some devices have critical response requirements. That is, failure to respond to a request therefrom within a critical time period often results in the loss of data. The loss of data occurs because new incoming data overrides the data that was to be transferred, or alternately, results in the transmission of meaningless information because the transmit side of the device attempted to retrieve data that had not yet been provided. These situations are complimentary versions of the same thing and are generally referred to as data overrun and data underrun, respectively. Under heavy input/output loads this condition frequently occurs because the local bus traffic of the microprocessor simply does not permit response to local bus requests within the required critical time periods. The most common solution to the bus latency condition is to provide double buffering and utilize a first in-first out (FIFO) system in front of the transfer mechanism to relieve the instantaneous requirements of any device accessing that buffer. Consequently, the bus need only respond to the average short term load. However, such a solution becomes expensive and requires large assemblies as well as an increase in the overall power requirements thereof.

The condition of bus occupancy occurs when the data transfer traffic increases such that it requires a significant portion of the bus bandwidth and, as a consequence, the capacity of the microprocessor to compute is diminished. Such a condition subsequently impacts the entire throughput of the system. Traditionally, this condition has been resolved by distributing the data transfer load over more microprocessors and/or introducing faster microprocessors. Both solutions are quite expensive.

Interrupt latency occurs upon completion of the transfer of information by a device interface controller to the controlled peripheral, whereupon an interrupt is generated to request further data, information, or instructions. The time required for the microprocessor to respond to such an interrupt request may be critical for any one of several reasons. The most important of these reasons is that the failure to respond to such an interrupt can cause the microprocessor to fail to recognize any subsequent interrupt from the same source that occurs before the pending interrupt is acknowledged. Although it is possible for modern devices to respond rapidly to interrupts, a heavy interrupt load on any microprocessor causes delays in responding to subsequent interrupts, i.e., simply overloading the microprocessor results in a backup of interrupts awaiting service while others are being serviced.

The condition of interrupt latency is compounded by the condition of interrupt service times. Even with present interrupt times of, minimally, about one millisecond, in terms of high speed devices, this is a snails pace response. The interrupt service time, i.e., the one millisecond minimum, stems from the simple fact that once an interrupt request has been responded to by the microprocessor, the request, per se, must still be serviced. A typical condition is that a device designed for receiving data, must first be initialized, i.e., put in a ready position, before the first piece of data is transferred thereto. Failure to do this can cause both data overruns and data underruns in the same way as bus latency. Further, initialization requires the transfer of commands and controls to instruct the device where to store the incoming data and ascertaining that it is now eligible to receive data. In addition, error checking, to ensure that previous transmissions have been correctly sent, must also be performed prior to initialization to ensure that initialization does not result in a data overrun. Finally, the microprocessor, in order to execute its program and process data, must have access to the local bus thereof to effect that processing of data, that is the microprocessor must access the bus at least as long as it takes to complete the required processing. This frequently results in difficulties because present device interface controllers require considerable servicing by the microprocessor in order to effectively serve all the interrupts and avoid some of the problems stated above. Consequently, the real task, i.e. computational tasks, of the microprocessor is slowed and becomes effectively bound by the device interface controller.

Thus, the development of faster peripherals and/or faster microprocessors are of limited value without a more comprehensive device interface controller.

SUMMARY OF THE INVENTION

Accordingly, it is one object of the present invention to provide an efficient device interface controller that substantially reduces the load on the local microprocessor and, in addition, is adapted to service a plurality of different peripherals.

This object is accomplished, at least in part, by a device interface controller supporting a multiple access high speed bus and having means for providing the command and control instructions needed to operate a plurality of different peripherals interconnected thereto.

Other objects and advantages of the present inventions will become apparent to those skilled in the art from the following detailed description read in conjunction with the appended claims and the drawings attached hereto.

DETAILED DESCRIPTION OF INVENTION

Figure 1:
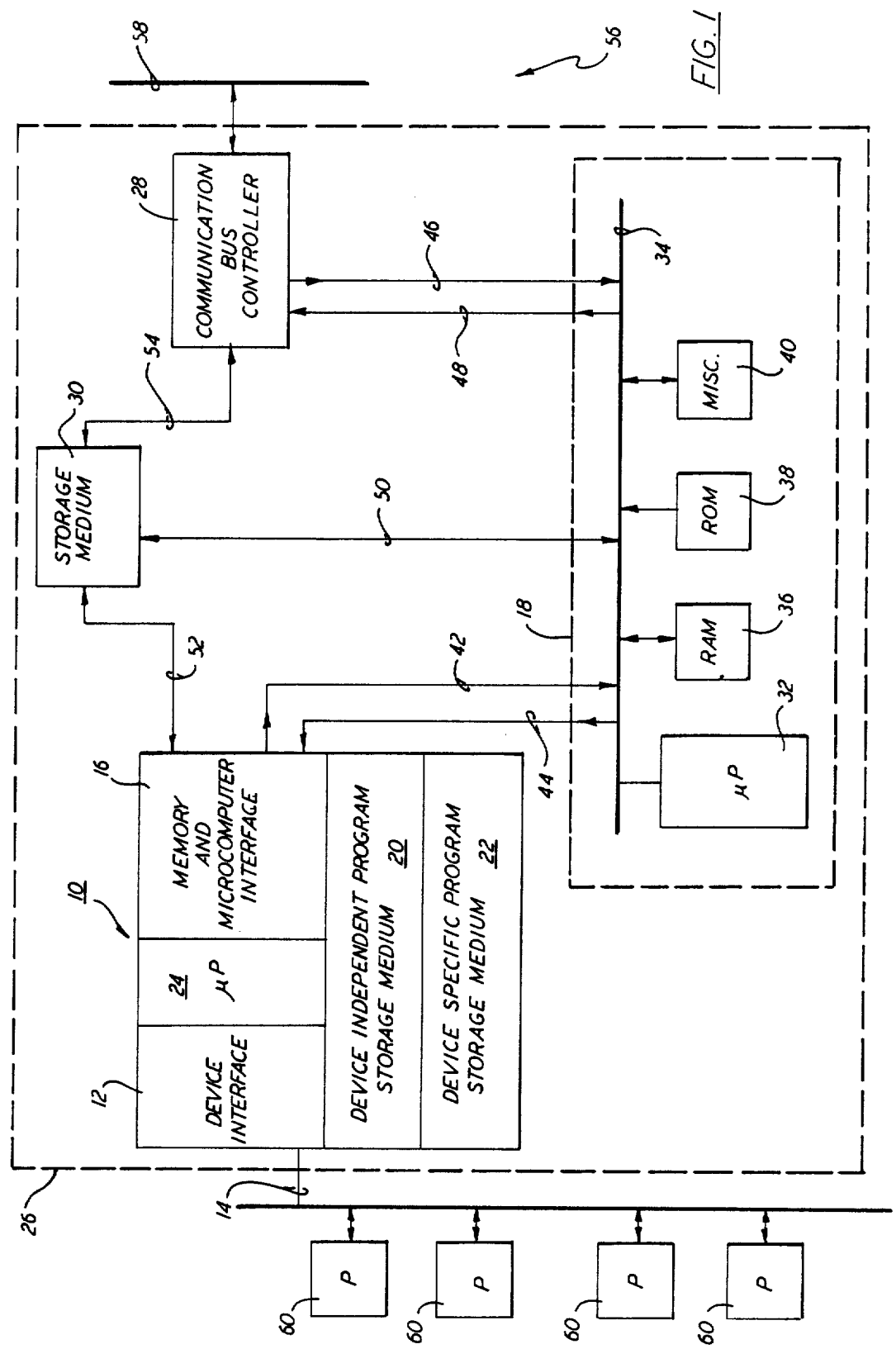
FIG. 1 is a block diagram of an apparatus having a device interface controller embodying the principles of the present invention.

A device interface controller, generally indicated at 10 in the drawing and embodying the principles of the present invention, includes means 12 for interfacing with a device bus 14, means 16 for interfacing with a microcomputer 18, means 20 for storing a device independent program, means 22 for storing a device specific program and a dedicated microprocessor 24.

The controller 10, as shown in FIG. 1, is shown in one particularly efficient environment. In one preferred application, the controller 10 is incorporated as an integral part of a data transport controller, generally indicated at 26. The data transport controller 26 preferably includes a communication bus controller 28, a storage medium 30, and the aforementioned microcomputer 18. The microcomputer 18 includes a microprocessor 32 having a local bus 34 associated therewith to which bus 34 a random-access-memory (RAM) 36, a read-only-memory (ROM) 38 and a local service program portion 40 are interconnected. One particular data transport controller 26 is described and discussed in U.S. patent application Ser. No. 205,457 entitled "Data Transport Control Apparatus" filed on even date herewith and assigned to the assignee hereof. This patent application is hereby deemed incorporated herein by reference.

As discussed in the above-referenced patent application Ser. No. 705,457 entitled "Data Transport Control Apparatus" the only direct connections between the device interface controller 10 and the microcomputer 18 are an interrupt line 42, for conveying interrupt request signals from the device interface controller 10 to the microcomputer 18, and a channel attention line 44 for conveying channel commands from the microcomputer 18 to the device interface controller 10. Similarly, direct communication between the communication bus controller 28 is limited to an interrupt request line 46 and a channel attention line 48. The microcomputer 18, however, has interconnectivity with the storage medium 30, via bus 50, for conveying control information, address information and data therebetween. In addition, the device interface controller 10 and the communication bus controller 28 are interconnected to the storage medium 30 via address/data lines, 52 and 54, respectively. Examples of communication bus controllers particularly adapted for use in the data transport controller 26 are described and discussed in U.S. patent applications Ser. Nos. 670,682 and 670,701 both filed on Nov. 13, 1984 and assigned to the assignee hereof.

As arranged in FIG. 1 the data transport controller 26 having the device interface controller 10 as an element thereof provides the essential functions of a peripheral interface device 56. One such peripheral interface device 56 being described and discussed in U.S. patent applications Ser. Nos. 705,464 and 705,462 respectively entitled "Communication Subsystem" and "System For Providing Data Services to a Circuit Switched Exchange" both filed on even date herewith and assigned to the assignee hereof. These applications are deemed incorporated herein by reference. In the referenced application Ser. No. 705,464 entitled "Communication Subsystem" a data communication subsystem having, inter alia, at least one peripheral interface device 56 and at least one network interface device interconnected via a intrasubsystem bus 58 is discussed. As mentioned therein, the peripheral interface device 56 and the network interface device are, preferably, substantially identical. In the referenced application Ser. No. 705,462 entitled "System For Providing Data Services to a Circuit Switched Exchange" a data services adjunct includes a voice/data interface device servicing a plurality of twisted pairs of wires. Each twisted pair therein being a subscriber loop of a conventional voice only communication path. Hence, although the device bus 14 is depicted in FIG. 1 hereof as interconnecting with a plurality of peripherals 60, the device bus 14 equally serves where appropriate, as an output bus from a network interface device to, for example, a digital switching network. In such an arrangement, the device interface controller 10 supports a plurality, for example, eight of full duplex PCM channels. In such an arrangement, each of the peripherals 60, as depicted in FIG. 1, would effectively correspond to one of the full duplex PCM channels.

Figure 2:
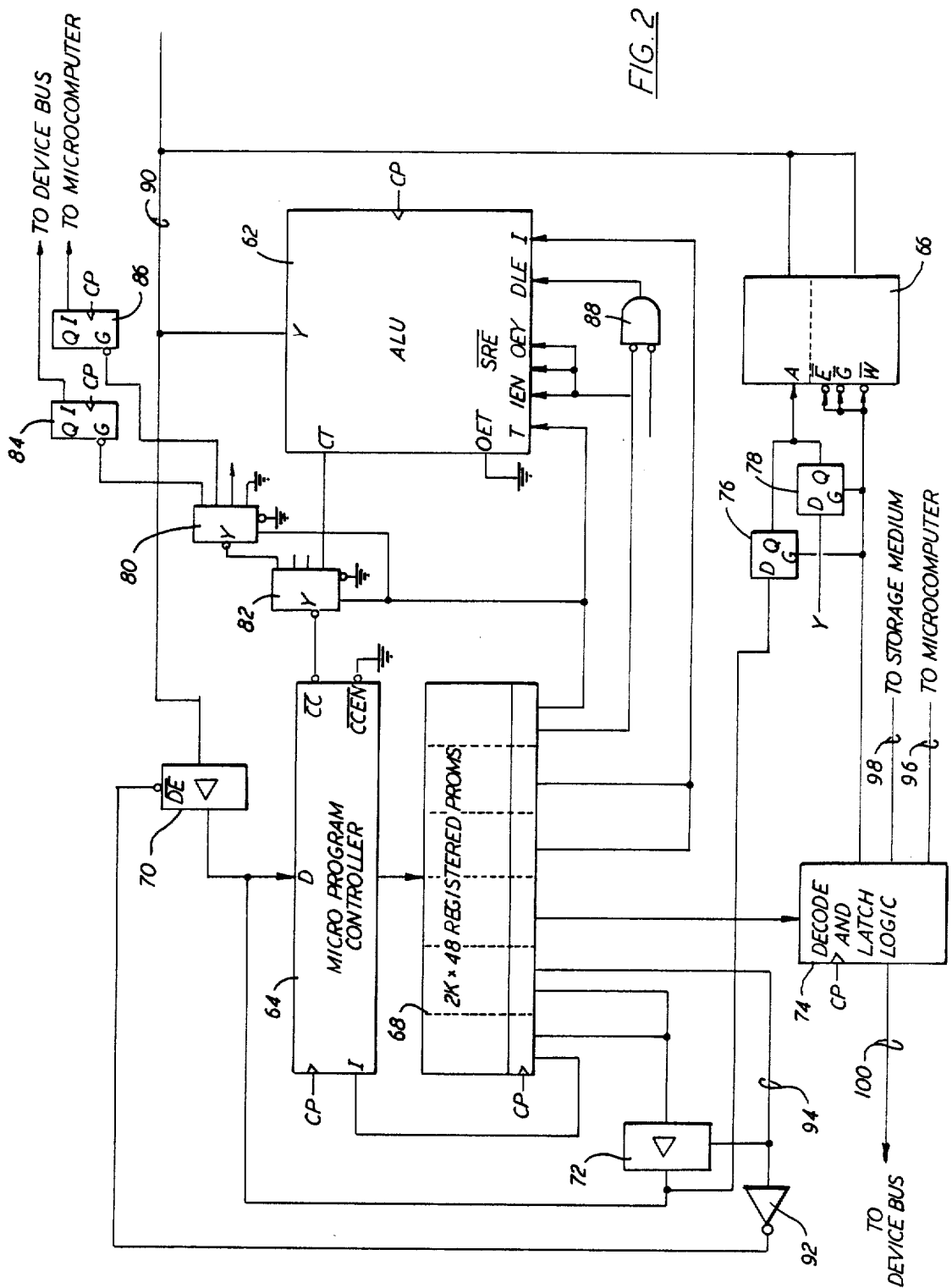
FIG. 2 is a block diagram of the device interface controller shown in FIG. 1.

A more detailed block diagram of a preferred embodiment of the device interface controller 10 is shown in FIG. 2 and includes an arithmetic logic unit (ALU) 62, a microprogram controller 64, a local, or scratch pad, memory 66, and a programmable read-only-memory (PROM) bank 68. In addition, the device interface controller 10 includes first and second tri-state buffers, 70 and 72, respectively, a decode and latch logic unit 74, first and second address latches, 76 and 78 respectively, first and second multiplexers, 80 and 82, respectively, and first and second flip-flops, 84 and 86, respectively. In addition, a clock gate 88 is provided having one input thereto being provided via an external master clock, not shown in FIG. 2.

An attempt to recite an exact correspondence between the elements recited immediately above in conjunction with FIG. 2 and the delineated portions referenced in FIG. 1 would be quite difficult. Nevertheless, a general comparison is provided hereinafter for the convenience of the reader.

The ALU 62, the microprogram controller 64, and the scratch pad memory 66 including the address latches, 76 and 78, associated therewith essentially function as the dedicated microprocessor 24. The PROM bank 68 provides both the device independent and device specific program storage mediums, 20 and 22, respectively. The first flip-flop 84, the multiplexers 80 and 82, and the decode and latch logic unit 74 effectively function as the device bus interface means 12 whereas the second flip-flop 86, the multiplexers 80 and 82, and the decode and latch logic unit 74 effectively function as the memory/microcomputer interface 16. The decode and latch logic unit 74 associated with the device bus interface means 12 and the memory/microcomputer interface 16 provide strobe signals to the high speed parallel bus 14 and the address/data line 52 to the data storage medium 30. In addition, a multiplexed address-/data bus 90 is provided, which bus is shared by the device interface means 12 and the memory/microcomputer interface means 16.

In operation, the device interface controller 10 effects the transfer of data between the storage medium 30 and the peripherals 60 at the command of the microcomputer 18. For the following discussion of the general operational sequence of the device interface controller 10, and the controller 10 is first considered to be in a quiescent state. In that state, the device bus 14 and the channel attention line 44 are monitored by the microprocessor 24 to determine if a peripheral 60 or the microcomputer 18, respectively, is about to transfer data therethrough. The device bus 14 condition is effectively monitored via the first flip-flop 84 and the channel attention line is effectively monitored via the second flip-flop 86. The outputs of the flip-flops, 84 and 86, are provided to the first and second multiplexers, 80 and 82, interconnecting the ALU 62 and the microprogram controller 64. In this fashion the dedicated microprocessor 24 monitors the condition, or status, of the device bus 14 and channel attention line 44 by continually testing the output of the multiplexers, 80 and 82. Thus, the status of the externally interconnected peripherals 60 as well as that of the microcomputer 18, at least with respect to the device interface controller 10, is always known to the dedicated microprocessor 24 thereof.

For the following discussion it is assumed that data is be transferred to one of the peripherals 60 which data has been stored, or provided, to the storage medium 30 via either the communication bus controller 28 or the microcomputer 18. The microcomputer 18 controls and monitors the storage medium 30 and the communication bus controller 28 as well as the device interface controller 10 and provides a channel attention signal, by, for example, a binary level change, via line 44 to the memory/microcomputer interface 16, via the second flip-flop 86. Upon sensing this condition the microprogram controller 64 causes strobe signals to be sent to the storage medium 30 and begins the transfer of data from the storage medium 30 into the scratch pad memory 66.

The data in the scratch pad memory 66 is then, if necessary, manipulated by the arithmetic logic unit 62 and the instruction information is provided to the PROM bank 68. The instructions so provided to the PROM bank 68 designate the particular peripheral 60 to which the data is to be provided. The device independent program portion 20 of the PROM bank 68 then performs the necessary operations that are common to all peripherals 60. Then, depending on the particular one of the peripheral 60 to which the data is to be provided, that portion of the device specific program is accessed and the specific instructions for that particular peripheral 60 are provided to the microprogram controller 64 via the second tri-state buffer 72. As shown in FIG. 2, the first and second tri-state buffers, 70 and 72 respectively, are operationally mutually exclusive. That is, information can be provided to the microprogram controller 64 either from the address data bus 90 or from the PROM bank 68. Such an exclusionary operation is ensured by means of an inverter 92 in the enable line of the tri-state buffers, 70 and 72, and positioned between the second tri-state buffer 72 and the first tri-state buffer 70. Hence, if one of the tri-state buffers, 70 or 72, is enabled, the binary inverse of that enabling signal is provided to the other tri-state buffer, 72 or 70, thus preventing information flow thereacross.

Upon receipt of the specific instructions for the particular peripheral 60 addressed in conjunction with the general instructions therefor, the microprogram controller 64 transfers information from the scratch pad memory 66 to the particular addressed peripheral 60 via the multiplexed address/data bus 90. Once the specific instruction set for the particular peripheral 60 has been accessed and accepted by the microprogram controller 64 the actual data transfer between the storage medium 30 and the particular addressed peripheral 60 is, effectively, direct, i.e. without requiring further instruction manipulation. Hence, information is received via the multiplex address/data base 90, operated upon by the arithmetic logic unit 62, if necessary, and directly returned, or sent out, over the multiplexed address/data bus 90 to the designated peripheral 60.

Upon completion of the transfer of all data stored in the storage medium 30 an interrupt signal can be provided to the microcomputer 18 via the interrupt request line 96 of the decode and latch logic unit 74.

When information is to be transferred from a peripheral 60 to the storage medium 30, the data and instruction information flow is reversed from that described above. One of the particular advantages of the preset device interface controller 10 is that the device independent program is designed to contain all instructions common to all peripherals 60 interconnected to the device bus 14. Thus, the device specific program need only contain those instructions specific to the individual peripheral 60 attached thereto. For example, the device independent program might contain all general read and write instructions for all peripherals 60, However, for example, since it would be folly to attempt to "write" an instruction or data to a keyboard, the device specific program relating to that keyboard would delete any such write instruction. Similarly, as it would be folly to attempt to read information from a high speed printer, the device specific program therefor that printer would not contain such an instruction. In addition, all peripheral related information is stored in the PROM bank 68 and thus there is no reduction in the capacity of the storage medium.

The above mentioned device independent and device specific programs are very well known in the art and the details of any particular program are not deemed necessary for a complete understanding of the present invention. However, it should be noted that, in its most advantageous embodiment, all of the peripherals attached to the device bus 14 operate under the same communication protocol. One particular apparatus and method for accomplishing such an embodiment is described and discussed in U.S. Patent Application Ser. No. 705,461 entitled "Apparatus and Method For Executing Communication Protocol Conversions" filed on even date herewith and assigned to the assignee hereof. This application is deemed incorporated herein by reference. As a result of assigning each peripheral interface card the task of executing only one communication protocol conversion, the device independent program can be generalized and provide the skeleton for all instructions and communications with those peripheral 60. In such a fashion, the device specific program would then only deal with the particular idiosyncracies of each individual peripheral 60 attached thereto. Ordinarily, in an environment such as discussed above it would be clearly unnecessary to require any variation in the device specific program once the peripheral interface device 56 is installed. Nevertheless, the device specific program can be dynamically changed using known writeable control store (WCS) techniques.

The scratch pad memory 66, used to maintain data therein while data is to be transferred from the device interface controller 10 to the storage medium 30, allows the storage medium 30 to appear dedicated totally to the device interface controller 10. This independent and dedicated operation of such a storage medium 30 is described and discussed in the above referenced patent application Ser. No. 705,457 "Data Transport Control Apparatus". Thus, when information is being transferred from the storage medium to the device interface controller 10, the scratch pad medium 66 maintains data and addresses therein to effectively buffer that information while the arithmetic logic unit 62 is operating on current information. Hence, during a data transfer the arithmetic logic unit 62 receives a continuous flow of information and, hence, little or no time is lost awaiting information processing.

The step-by-step transfer of information is effectively controlled by strobe signals produced via the decode and latch logic unit 74 and provided to the storage medium 30 via strobe line 98 thereof and by strobes provided to the data bus 14 and the addressed peripheral 60 via strobe line 100.

Figures 3, 3B:
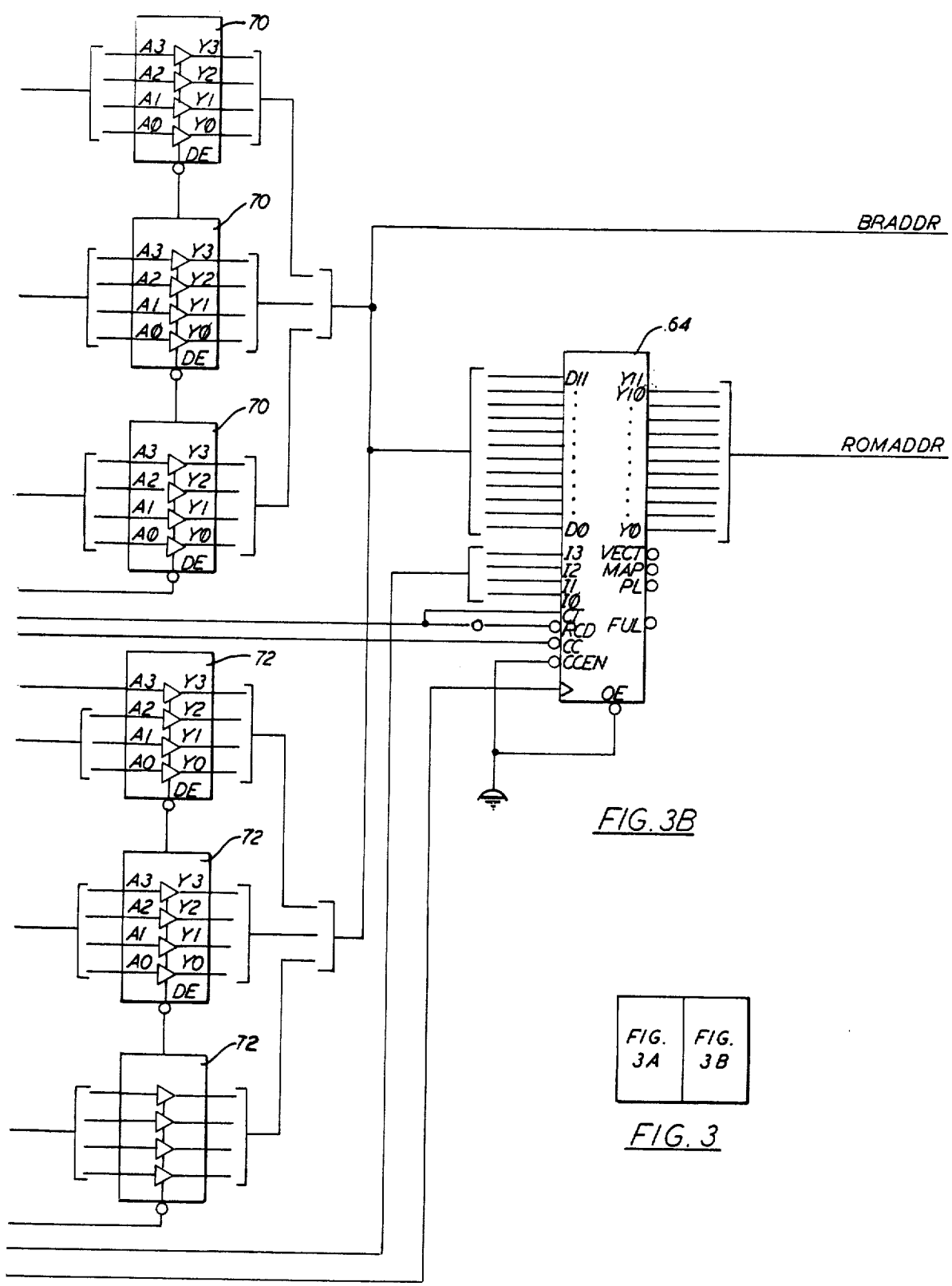
FIGS. 3, 3A and 3B in combination are a diagram of a typical microprocessor and program controller adapted for use as shown in FIG. 2.
Figure 3A:
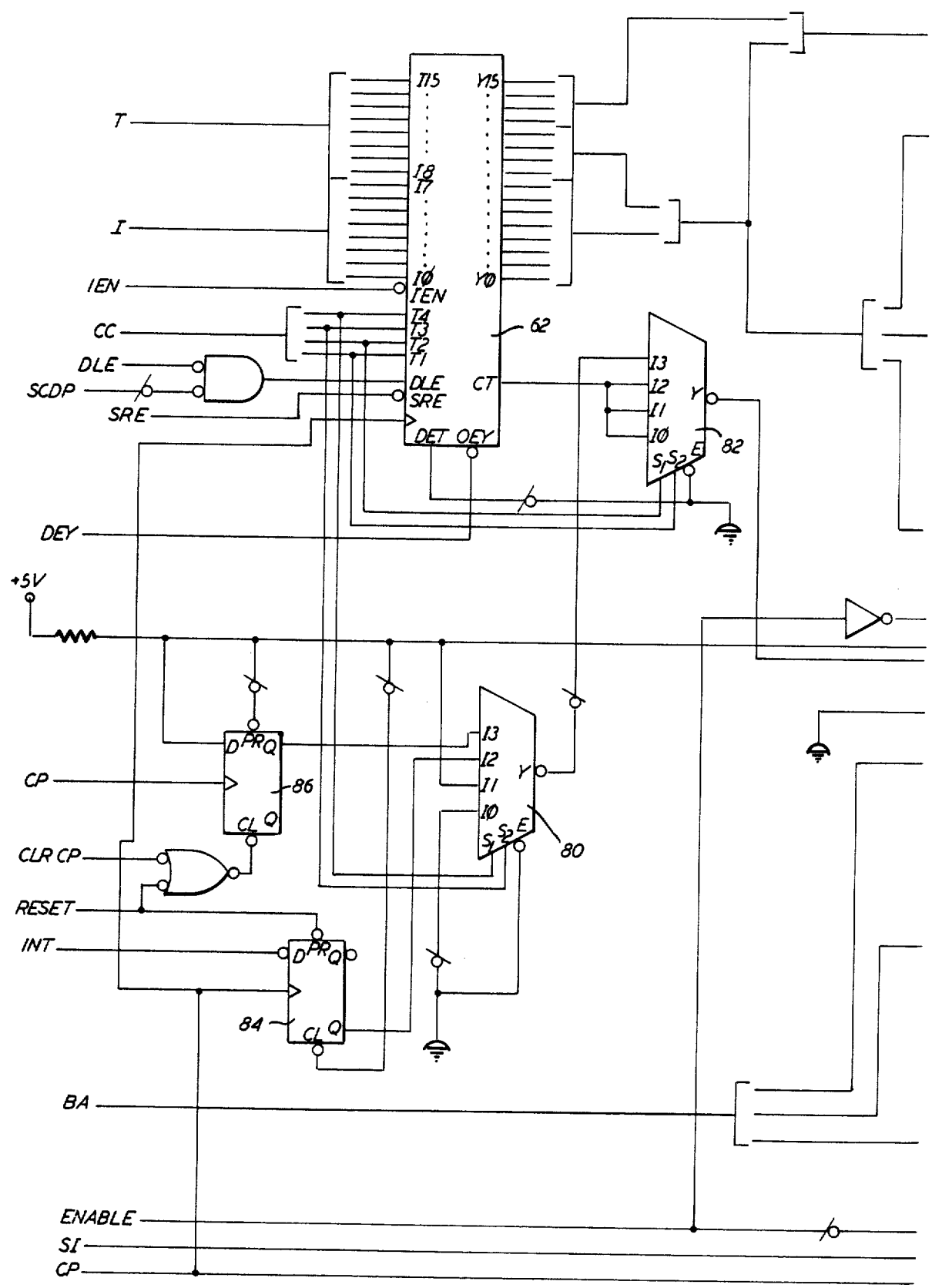

In one specific exemplary implementation, particularly as shown in FIGS. 3-6, the device interface controller 10 includes an arithmetic logic unit 62, shown in FIG. 3, that is a 29116 manufactured and marketed by AMD Corp. of Sunnyvale, California. The microprogram controller 64 is a 2910A manufactured and marketed by AMD Corp. In addition, the multiplexers 80 and 82, as shown in FIG. 3, are 74AS352, manufactured and marketed by Texas Instruments Corp. of Dallas, Texas. The first and second flip-flops, 84 and 86, respectively, are 74ALS74 also manufactured and marketed by Texas Instruments Corp. Further, as shown in FIG. 3, the first and second tri-state buffers, 70 and 72, respectively, each include three 74ALS1244 marketed and manufactured by Texas Instruments Corp.

Figure 4:
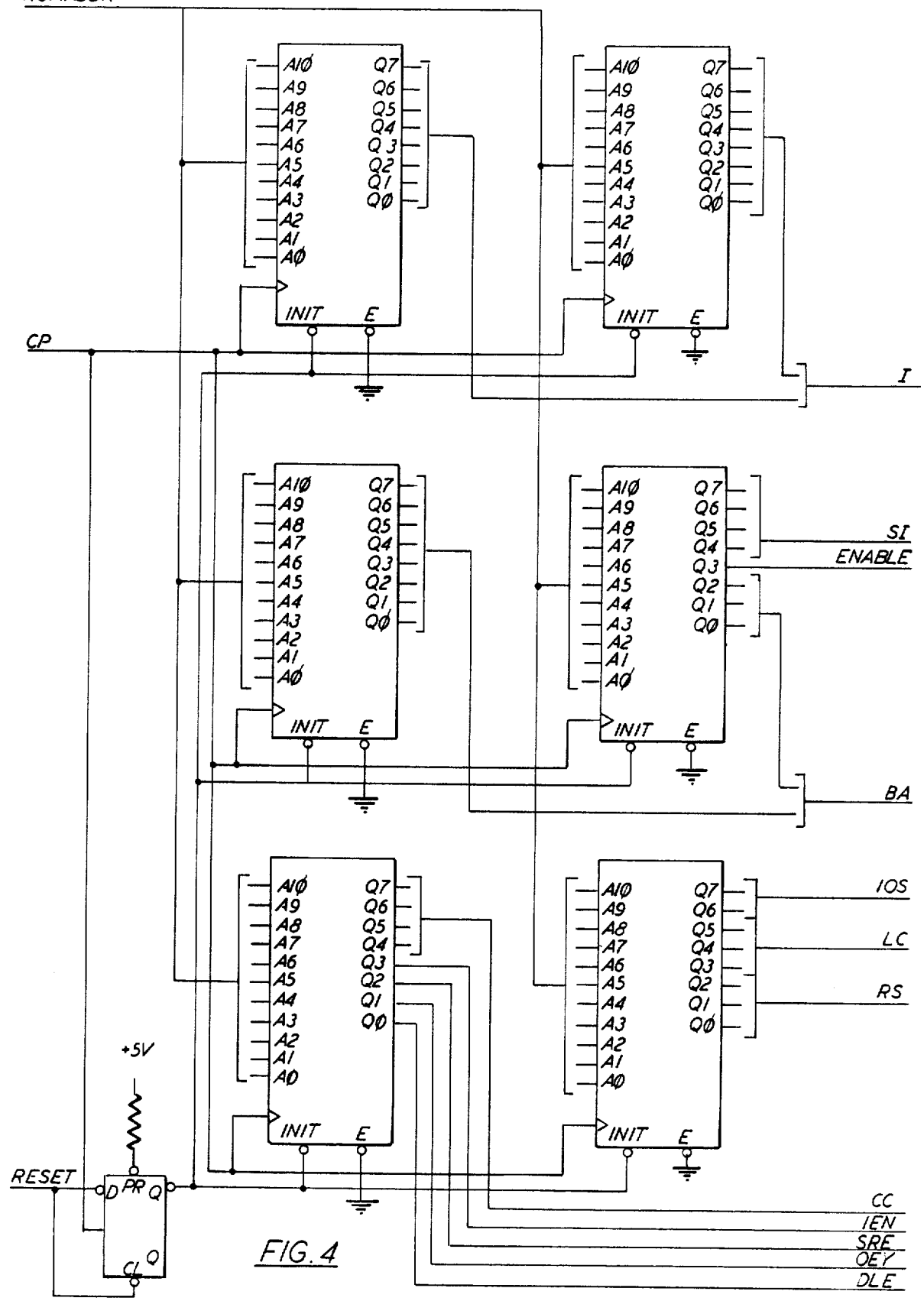
FIG. 4 is a diagram of the device dependent and independent portion shown in FIG. 2.

In this exemplary implementation, with reference to FIG. 4, the PROM bank includes six 27S47 manufactured and marketed by AMD Corp. Each 27S47 being adapted to support a programmed memory capacity of about 16 kilobits. Such a capacity has been found to be more than sufficient to support both the device independent and the device specific programs necessary to control a plurality of peripherals operating under a given communication protocol.

Figure 5:
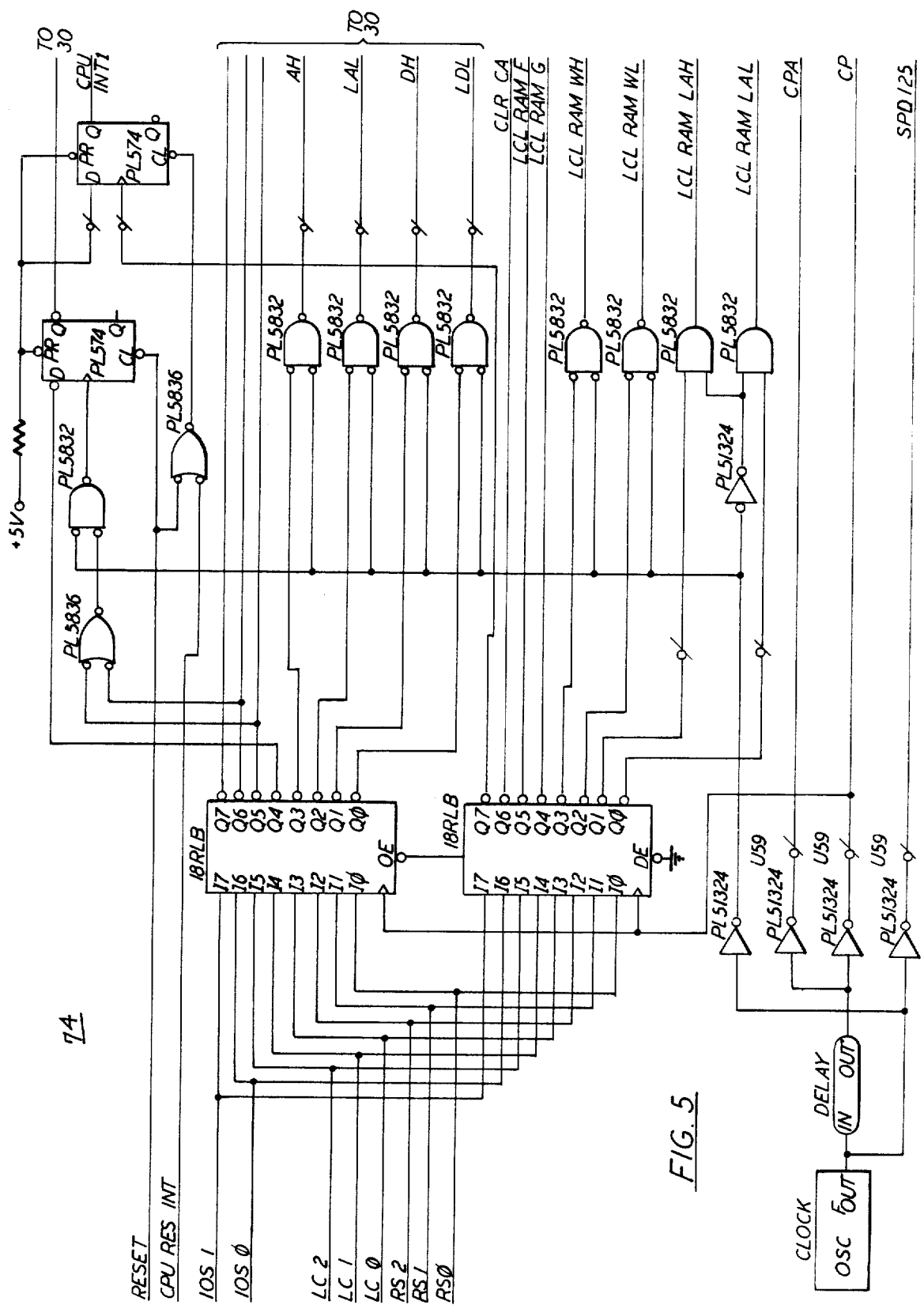
FIG. 5 is a diagram of a memory interface useful as shown in FIG. 2.

One particular embodiment of a decode and latch logic unit 74, including an oscillator module 102, is shown in FIG. 5. Therein, the decode and latch logic unit 74 includes a first and second PAL 16R8L manufactured and marketed by AMD Corp. as well as a plurality of logic gates. In this embodiment, the oscillator module is a K1114A-6-00MHZ marketed and manufactured by Motorola Inc. of Phoenix, Arizona.

Figure 6:
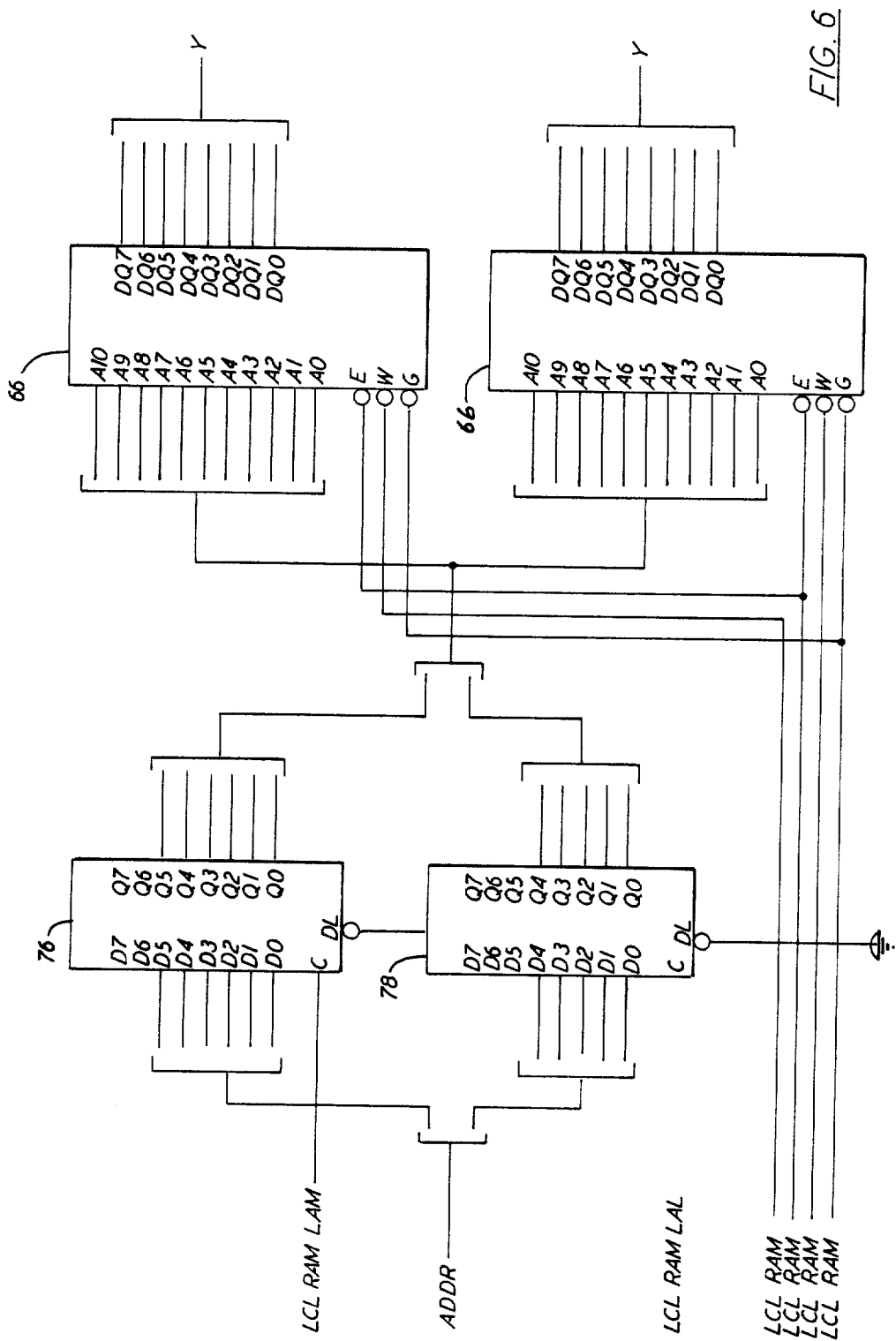
FIG. 6 is a diagram of a local memory useful as shown in FIG. 2.

A preferred implementation of the scratch pad memory 66, including first and second address latches, 76 and 78, respectively, is depicted in FIG. 6. Therein the scratch pad memory 66 includes a pair of HM65162 random-access-memory devices manufactured and marketed by Harris Corp. of Melbourne, Florida each providing about 16 kilobits of memory storage. As shown, each latch 76 and 78, is a 74ALS373 manufactured and marketed by Texas Instruments Corp.

Advantageously, since all peripheral related instructions are provided separately from the storage medium for data being transferred, the microcomputer 18 is only interrupted after all data for a particular peripheral is transferred. In addition, the microcomputer is relieved of providing such instruction as is the data storage medium 30. Further, by dividing the peripheral instruction sets into the device independent and device specific programs, a plurality of peripherals can be controlled by a single controller 10 while, nevertheless lessening the interrupt loading of the microcomputer 18. Thus, the conditions of bus latency, bus occupancy, interrupt latency and interrupt service times are substantially completely eliminated while the number of peripherals controlled by a single controller is increased.

Although the present invention has been described herein with respect to an exemplary embodiment, it will be understood that other arrangements and configurations may be developed that are within the scope of the present invention. Consequently, the present invention is deemed limited only by the attached claims and the reasonable interpretation thereof.

What is claimed is:

1. A device interface controller, for use in a data transport controller which includes a storage medium for temporarily storing data transmitted from an external source, and a microcomputer for controlling transport of the transmitted data through the storage medium to any selected one of a plurality of data communication devices interconnected to the data transport controller through a device bus, said device interface controller comprising:

device bus interface means for interfacing with said device bus interconnected with said plurality of data communication devices;

interfacing means including microcomputer interfacing means for interfacing with said microcomputer and storage medium interfacing means for interfacing with said storage medium of said data transport controller;

instruction storing means separate from said storage medium, which includes common instruction storing means, for storing instructions for performing a data transfer operation which are common to all of said plurality of data communication devices, and specific instruction storing means, for storing instructions for performing a data transfer operation which are specific to each respective one of said plurality of data communication devices, including a selected one of the data communication devices; and a dedicated microprocessor responsive to said microcomputer through said microcomputer interfacing means for controlling data transport between said storage medium interfacing means with said storage medium and said bus device interface means with said plurality of data communication devices, wherein said dedicated microprocessor executes, for a data transport operation to the selected one of said data communication devices, common device instructions from said common instruction storing means which are common to all of said data communication devices, and specific device instructions from said specific instruction storing means which are specific to the selected data communication device.

2. Device interface as claimed in claim 1, wherein said microprocessor includes:

an arithmetic logic unit; and a microprogram controller, said arithmetic logic unit and said microprogram controller having a scratch pad memory associated therewith, whereby data manipulation can be performed on data transferred between said device bus interface and said storage medium interface means.

3. Device interface controller as claimed in claim 2 wherein said instruction storage means includes a plurality of programmable read-only-memory devices;

an address/data bus, and means for regulating access by said microprogram controller to said address/data bus and the output of said plurality of programmable read-only-memory devices.

4. Device interface controller as claimed in claim 3 wherein said access regulating means includes;

first tri-state buffer serially connected in said address/data bus between said storage medium and said microprogram controller;

a second tri-state buffer serially connected in the path from said output of said programmable read-only-memory and said microprogram controller; and means for exclusively enabling either said first or said second tri-state buffer.

5. Device interface controller as claimed in claim 4 wherein said exclusive enabling means is a binary inverter, said binary inverter being positioned serially between said first and said second tri-state buffers.

6. Device interface controller as claimed in claim 5 wherein said storage medium interfacing means includes an address/data bus.

7. Device interface controller as claimed in claim 1 wherein said storing means includes instructions only for said data communication devices operating under the same communication protocol.

8. Device interface controller as claimed in claim 1 wherein said instruction storage means is a plurality of programmable read-only-memory devices.

9. Device interface controller as claimed in claim 1 wherein said microcomputer interfacing means directly interfaces with and is limited to the receipt of channel attention signals from said microcomputer and generation of interrupt request signals from said controller.

10. Device interface controller as claimed in claim 9 wherein said direct microcomputer interface means includes a first flip-flop.

11. Device interface controller as claimed in claim 10 further comprising:

means for monitoring said device bus.

12. Device interface controller as claimed in claim 11 wherein said device bus monitoring means is a second flip-flop.

13. Device interface controller as claimed in claim 12 further comprising:

means for interfacing said direct microcomputer interface means and said device bus monitoring means with said dedicated microprocessor.

* * * * *